US011924708B2

(12) United States Patent
Hasegawa

(10) Patent No.: US 11,924,708 B2
(45) Date of Patent: Mar. 5, 2024

(54) INFORMATION PROCESSING DEVICE AND INFORMATION PROCESSING METHOD

(71) Applicant: SONY GROUP CORPORATION, Tokyo (JP)

(72) Inventor: Yuichi Hasegawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 277 days.

(21) Appl. No.: 17/309,409

(22) PCT Filed: Nov. 21, 2019

(86) PCT No.: PCT/JP2019/045559
§ 371 (c)(1),
(2) Date: May 25, 2021

(87) PCT Pub. No.: WO2020/116179
PCT Pub. Date: Jun. 11, 2020

(65) Prior Publication Data
US 2022/0038852 A1 Feb. 3, 2022

(30) Foreign Application Priority Data
Dec. 5, 2018 (JP) ................. 2018-228016

(51) Int. Cl.
H04W 4/02 (2018.01)
G06F 3/01 (2006.01)
(Continued)

(52) U.S. Cl.
CPC ............ H04W 4/027 (2013.01); G06F 3/011 (2013.01); H04W 4/029 (2018.02); H04W 72/51 (2023.01)

(58) Field of Classification Search
CPC ..... H04W 4/027; H04W 4/029; H04W 72/51; G06F 3/011
(Continued)

(56) References Cited

U.S. PATENT DOCUMENTS 10,756,788 B1 * 8/2020 Jiang ............... H04B 7/15521
2013/0135146 A1 5/2013 Ransom
(Continued)

FOREIGN PATENT DOCUMENTS

JP 11-308662 A 11/1999
JP 2011-082876 A 4/2011
(Continued)

OTHER PUBLICATIONS

International Search Report and Written Opinion of PCT Application No. PCT/JP2019/045559, dated Jan. 7, 2020, 08 pages of ISRWO.

Primary Examiner — Thomas J Lett
(74) Attorney, Agent, or Firm — CHIP LAW GROUP

(57) ABSTRACT

There is provided an information processing device that includes a blocking detection unit to detect blocking of a communication channel to a reproduction device which reproduces content on the basis of content data, a movement calculation unit to calculate, in a case where the blocking of the communication channel is detected, an amount of movement of the reproduction device to a position that escapes the blocking, and a control unit to control generation of the content data on the basis of the amount of movement.

18 Claims, 12 Drawing Sheets

(51) Int. Cl.
*H04W 4/029* (2018.01)
*H04W 72/51* (2023.01)

(58) Field of Classification Search
USPC .................................................... 455/456.3
See application file for complete search history.

(56) References Cited

U.S. PATENT DOCUMENTS

2018/0357980 A1  12/2018  Miyazaki et al.
2019/0086677 A1   3/2019  Tomizawa

FOREIGN PATENT DOCUMENTS

| | | |
|---|---|---|
| JP | 2015130618 A | 7/2015 |
| JP | 2019-053644 A | 4/2019 |
| WO | 1999/043179 A1 | 8/1999 |
| WO | 2017/099077 A1 | 6/2017 |

\* cited by examiner

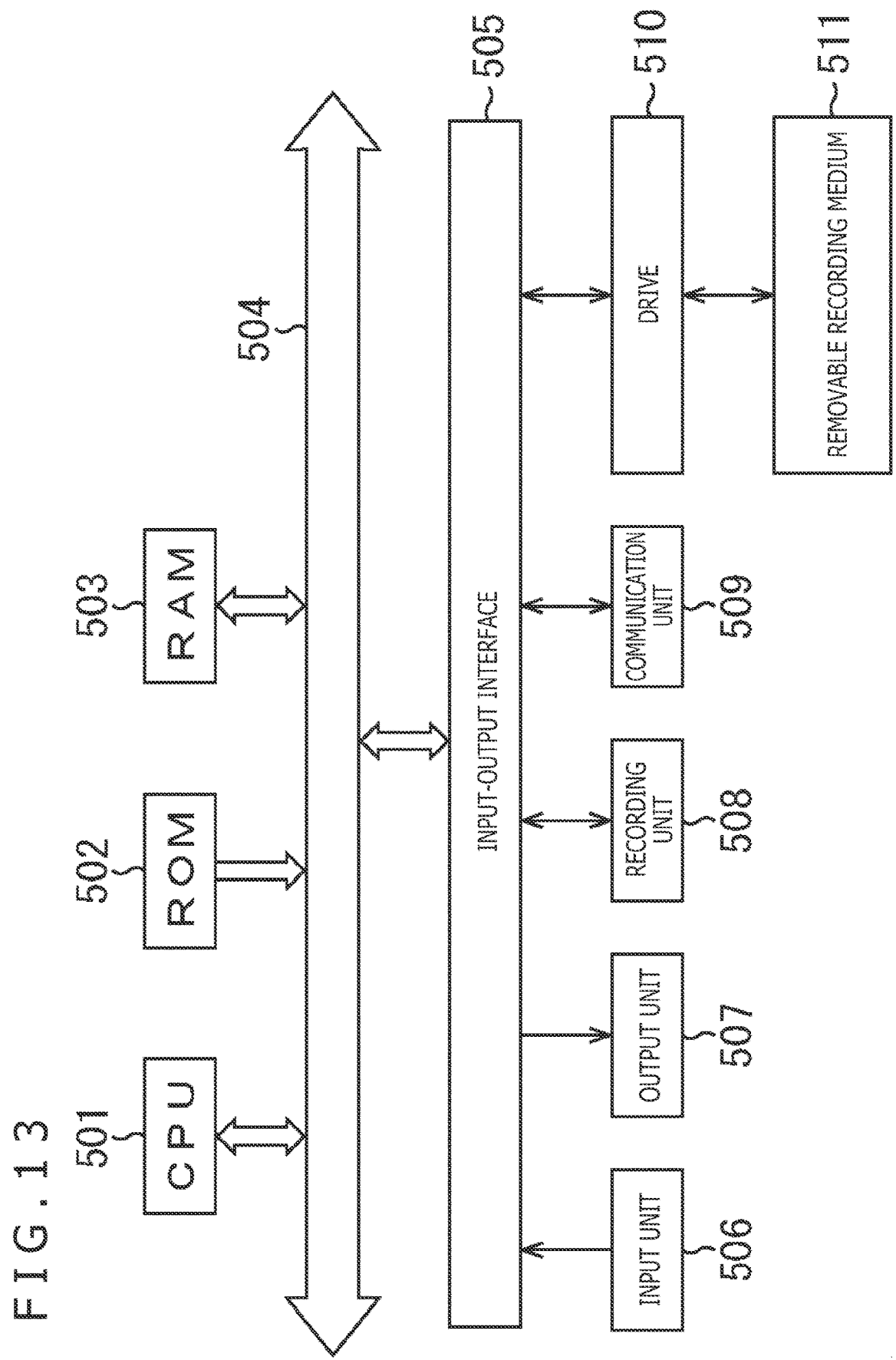

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/045559 filed on Nov. 21, 2019, which claims priority benefit of Japanese Patent Application No. JP 2018-228016 filed in the Japan Patent Office on Dec. 5, 2018. Each of the above-referenced applications is hereby incorporated herein by reference in its entirety.

TECHNICAL FIELD

The present technique relates to an information processing device and an information processing method and particularly relates to an information processing device and an information processing method by which an optimal communication channel can be ensured.

BACKGROUND ART

In recent years, VR (Virtual Reality) systems in which video rendered on a console of a high-end personal computer, game equipment, or the like is transmitted to an HMD (Head Mounted Display) and in which a cableless communication channel (transmission channel) is implemented have appeared.

In many of such VR systems, a frequency band higher than that for WLAN (Wireless Local Area Network) and the like that have been used conventionally is used so that a high transmission rate is attained. As specific examples, such systems using millimeter waveband as WiGig or WirelessHD, systems using 5G communication, and the like have been known.

Meanwhile, high-frequency band wireless communication such as 5G communication and millimeter-wave communication has been known to be higher in linearity in traveling of signals but weaker against blocking, as compared to such communication as WLAN using comparatively low frequencies.

Thus, upon occurrence of blocking with an obstacle, a person, or the like between a transmitter such as the console and a receiver such as the HMD, deterioration in communication environment makes it difficult for video information, audio information, and the like to be transmitted correctly. As such, deterioration in quality of video or audio caused by a transmission error, transmission delay, or the like occurs and deteriorates user experience.

Therefore, a technique for reducing the transmission error in video information or audio information by detecting a position of the obstacle with use of information acquired from a camera attached to the console and by selecting a communication channel on the basis of a result of such detection has been proposed (refer to PTL 1, for example).

CITATION LIST

Patent Literature

[PTL 1]
PCT Patent Publication No. WO2017/099077

SUMMARY

Technical Problem

In the technique described above, however, it is difficult to ensure an optimal communication channel.

That is, though it is essentially desirable to carry out communication through a path connecting a transmitter and a receiver preferably by a straight line, blocking (cutoff) of a communication channel causes selection of a suboptimal communication channel in the technique described above. The suboptimal communication channel selected in such a manner may deteriorate user experience because transmission error, transmission delay, and the like are more prone to occur therein compared with the communication channel linearly connecting the transmitter and the receiver.

The present technique has been developed in consideration of such a situation and aims at ensuring an optimal communication channel.

Solution to Problem

An information processing device according to a first aspect of the present technique includes a blocking detection unit configured to detect blocking of a communication channel to a reproduction device configured to reproduce content on the basis of content data, a movement calculation unit configured to calculate, in a case where the blocking of the communication channel is detected, an amount of movement of the reproduction device to a position that escapes the blocking, and a control unit configured to control generation of the content data on the basis of the amount of movement.

An information processing method according to the first aspect of the present technique includes steps of detecting blocking of a communication channel to a reproduction device configured to reproduce content on the basis of content data, calculating, in a case where the blocking of the communication channel is detected, an amount of movement of the reproduction device to a position that escapes the blocking, and controlling generation of the content data on the basis of the amount of movement.

In the first aspect of the present technique, blocking of the communication channel to the reproduction device configured to reproduce the content on the basis of the content data is detected, the amount of movement of the reproduction device to the position that escapes the blocking is calculated in the case where the blocking of the communication channel is detected, and the generation of the content data is controlled on the basis of the amount of movement.

An information processing device according to a second aspect of the present technique is an information processing device configured to reproduce content on the basis of content data, the information processing device including a blocking detection unit configured to detect blocking of a communication channel to another information processing device configured to transmit the content data, a movement calculation unit configured to calculate, in a case where the blocking of the communication channel is detected, an amount of movement of the information processing device to a position that escapes the blocking, and a wireless communication unit configured to transmit the amount of movement to the other information processing device through wireless communication.

An information processing method according to the second aspect of the present technique includes steps of, by an information processing device configured to reproduce content on the basis of content data, detecting blocking of a communication channel to another information processing device configured to transmit the content data, calculating, in a case where the blocking of the communication channel is detected, an amount of movement of the information processing device to a position that escapes the blocking, and transmitting the amount of movement to the other information processing device through wireless communication.

In the second aspect of the present technique, by the information processing device configured to reproduce the content on the basis of the content data, the blocking of the communication channel to the other information processing device configured to transmit the content data is detected, the amount of movement of the information processing device to the position that escapes the blocking is calculated in the case where the blocking of the communication channel is detected, and the amount of movement is transmitted to the other information processing device through the wireless communication.

BRIEF DESCRIPTION OF DRAWINGS

FIG. 13 is a diagram illustrating a configuration example of a computer.

DESCRIPTION OF EMBODIMENTS

Figure 1:
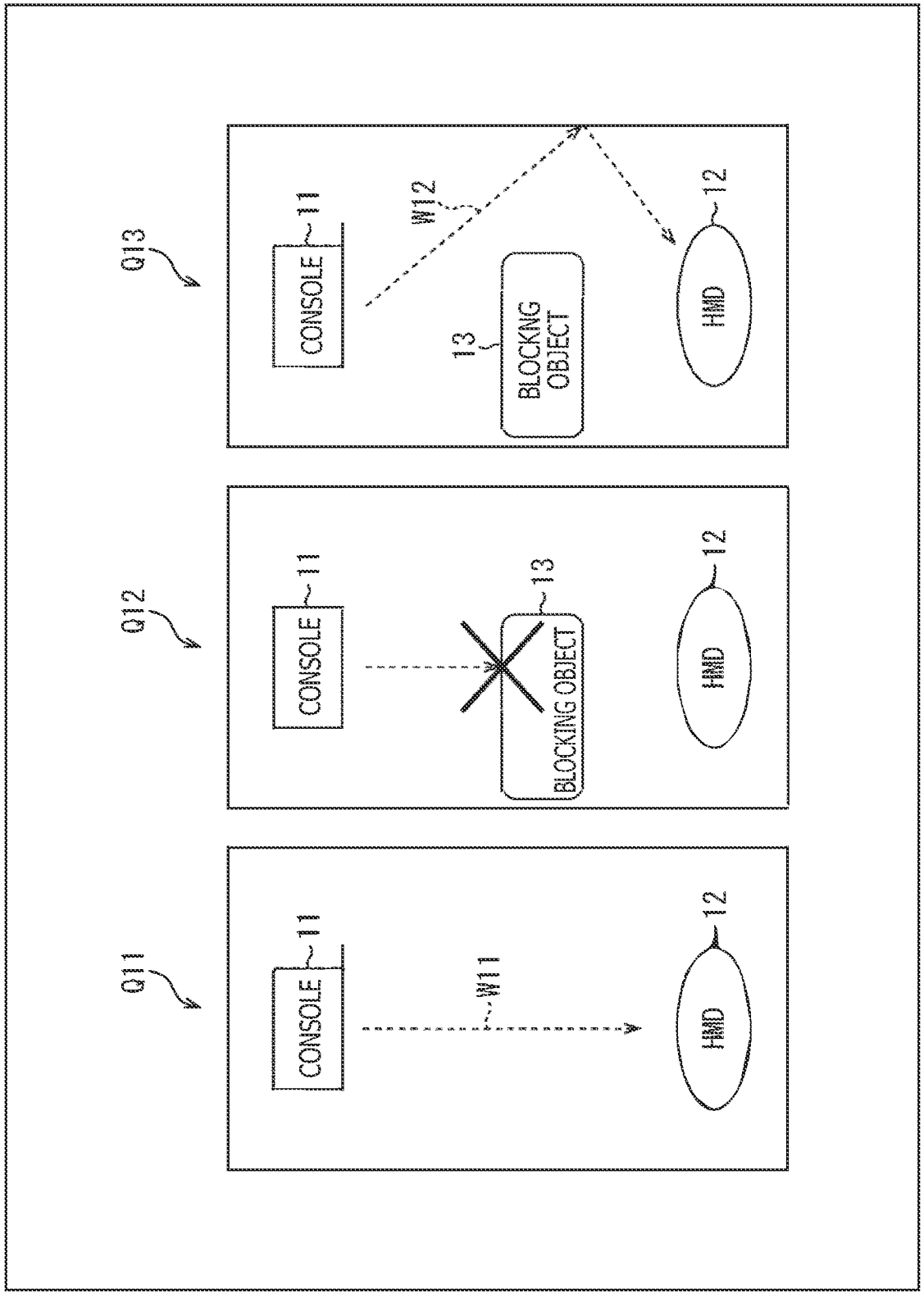
FIG. 1 is a diagram for description of blocking and switching of a communication channel.

Hereinbelow, embodiments of application of the present technique will be described with reference to the drawings.

First Embodiment

<Present Technique>

The present technique provides a system including a reproduction device configured to reproduce content and an information processing device configured to transmit content data to the reproduction device, the system being adapted to ensure an optimal communication channel by changing (correcting) a position of a user in a virtual space according to a blocking situation of a communication channel and by generating content data on the basis of the changed position.

Though the present technique can be applied to any system that is configured to reproduce content through transfer of content data by wireless communication, description will be given below on a case where the present technique is applied to a VR content reproduction system configured to reproduce VR content, as an example.

The VR content reproduction system to which the present technique is applied includes a console to function as a transmitter and an HMD to function as a receiver, for example.

In the VR content reproduction system, content data for reproduction of VR content (simply referred to as "content" hereinbelow) is transmitted from the console to the HMD through wireless communication, and the content is reproduced in the HMD on the basis of the content data. A user wearing the HMD views and listens to the content reproduced by the HMD.

Besides, position posture information indicating a position and a posture of the user in the virtual space reproduced through the content is transmitted from the HMD to the console as appropriate.

Here, the content data includes video information (video data) for reproduction (display) of video of the content and audio information (audio data) for reproduction of audio accompanying the video. Meanwhile, the content may include either the video or the audio only. That is, it is sufficient if the content data includes at least either the video information or the audio information.

Further, when the content is reproduced, video of the virtual space is displayed as the video of the content on the basis of the video information. Hereinbelow, a space where the console and the HMD actually exist may also be referred to as a "real space" while a virtual space that is reproduced through the content may also be referred to as a "virtual space."

The video based on the video information changes according to the position posture information indicating the position and the posture of the user wearing the HMD in the virtual space. In other words, the video based on the video information is presented as video (image) of the virtual space being viewed by the user who is in the virtual space and who is in a state with the position and the posture indicated by the position posture information. Additionally, the audio based on the audio information is presented as sounds in the virtual space being listened to by the user who is in the virtual space and who is in the state with the position and the posture that are indicated by the position posture information.

The position posture information indicating the position and the posture of the user in the virtual space can be obtained from results of measurement of the position and the posture of the user (HMD) in the real space. When the user changes the position, the posture, or the like in the real space, the position, the posture, or the like of the user in the virtual space also changes synchronously.

That is, the position posture information for the virtual space is information indicating the position and the posture of the user in a virtual space coordinate system having a reference position in the virtual space as an origin. On the side of the HMD, by contrast, actually measured is information indicating the position and the posture of the user in a real space coordinate system having a reference position in the real space as an origin.

A correspondence relation between the virtual space coordinate system and the real space coordinate system is predetermined, so that the information indicating the position and the posture of the user in the real space can be converted into the position posture information in the virtual space. Meanwhile, the position posture information indicating the position and the posture of the user (HMD) in the real space may be transmitted to the console, and the position posture information in the real space may be converted in the console into the position posture information in the virtual space.

In addition, though an example in which the content data is generated on the basis of the position posture information will be described below, the content data may be generated only from position information indicating the position of the user in the virtual space without use of information indicating the posture of the user.

In the VR content reproduction system, upon detection of blocking of the communication channel for transmission of the content data through wireless communication, the position posture information regarding the user is updated so that a relative positional relation between the virtual space and the user, that is, the position of the user in the virtual space, may be corrected according to a result of the detection. In other words, the position posture information is updated so that the position of the user in the virtual space may be moved according to the result of the detection of the blocking, aside from actual movement of the user.

In the VR content reproduction system, through such a process, a phenomenon called redirection is used, so that an optimal communication channel between the console and the HMD is ensured. The redirection refers to a phenomenon in which a perceptual movement amount and an actual physical movement amount discord because human being is greatly influenced by information based on the five senses including sense of sight.

Here, ensuring the optimal communication channel with use of the redirection according to the present technique will be described more specifically.

As illustrated by an arrow Q11 in FIG. 1, for example, it is assumed that a console 11 and an HMD 12 exist in the real space and that content data is transmitted from the console 11 to the HMD 12.

In this case, a communication channel (communication path) that linearly connects the console 11 and the HMD 12 and is represented by an arrow W11 is the optimal communication channel, and transmission errors, transmission delays, and the like for the content data ought to be minimized when the content data is transmitted through the communication channel.

In a case where a blocking object 13 is present between the console 11 and the HMD 12 as illustrated by an arrow Q12, for example, however, the optimal communication channel illustrated by the arrow Q11 is blocked by the blocking object 13, deteriorating the communication environment. That is, there is a possibility that the transmission error, the transmission delay, or the like may occur.

In the case where such blocking of the communication channel is detected, it is thus possible to search for such a suboptimal communication channel as illustrated by an arrow Q13, for example, and as not blocked by the blocking object 13 and to switch the communication channel for the transmission of the content data to the suboptimal communication channel.

In this example, a communication channel in which wireless signals outputted from the console 11 are reflected by an interior wall or the like and reach the HMD 12 as illustrated by arrows W12 is obtained as a search result for the suboptimal communication channel, and switching to the communication channel illustrated by the arrows W12 is carried out.

In transmission through the communication channel illustrated by the arrows W12, however, there is a higher possibility of occurrence of the transmission error, the transmission delay, or the like, as compared to transmission through the optimal communication channel illustrated by the arrow Q11.

Therefore, it is desired to ensure a communication channel including a straight line connecting the console 11 and the HMD 12 as the path, as much as possible.

In the technique, for this reason, by focusing attention on the fact that the HMD as a receiver is worn on a head of the freely movable user and making the user unconsciously move to a position at which the blocking by a blocking object can be avoided, the optimal communication channel may always be ensured. Thus, the transmission errors, the transmission delays, and the like for the content data and the deterioration in the user experience may be reduced.

Figure 2:
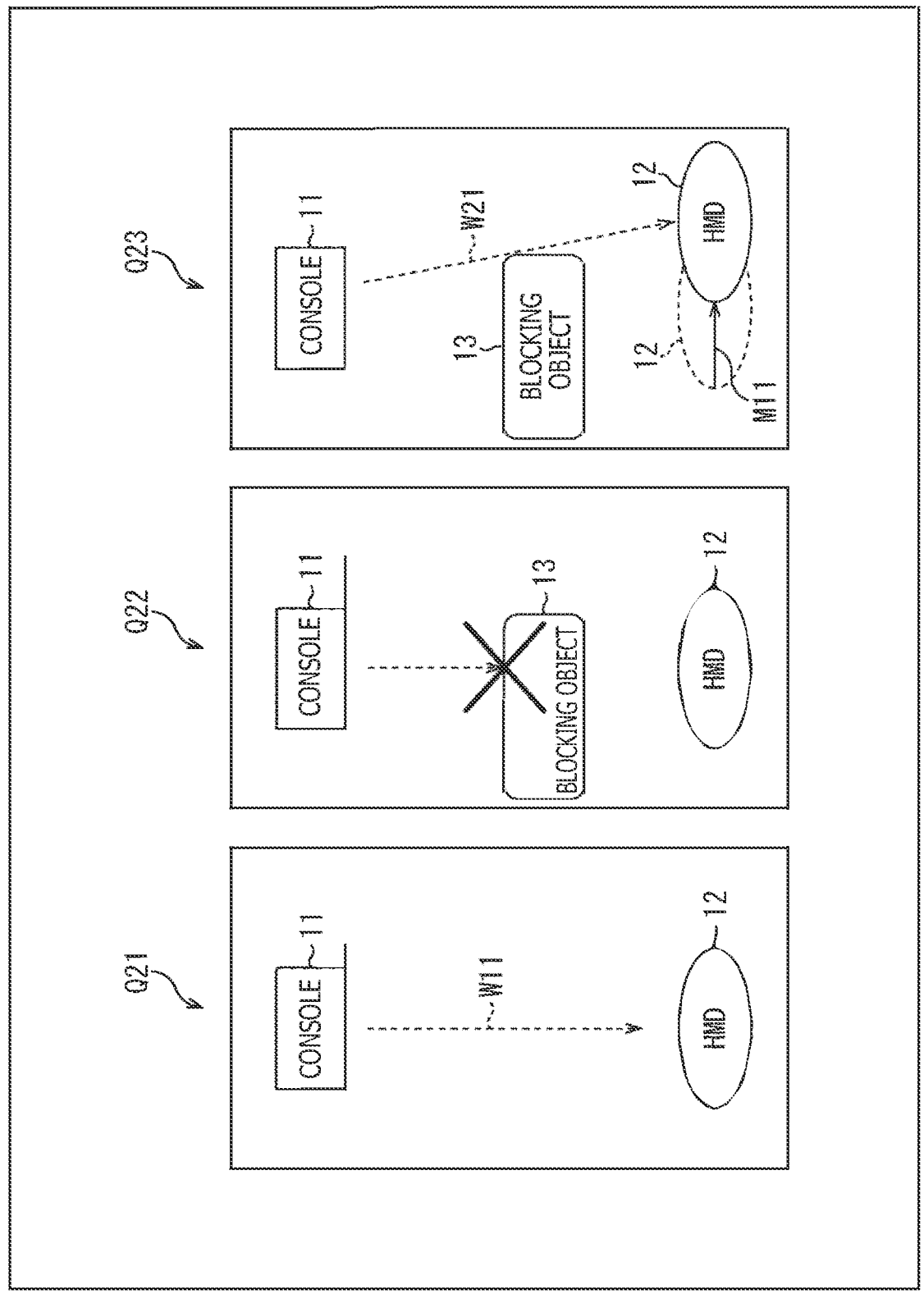
FIG. 2 is a diagram for description of ensuring an optimal communication channel.

Specifically, as illustrated by an arrow Q21 in FIG. 2, it is assumed that the console 11 and the HMD 12 exist in the real space and that content data is transmitted from the console 11 to the HMD 12. Incidentally, components in FIG. 2 corresponding to those in FIG. 1 are provided with the same reference signs, and description thereof is omitted appropriately.

In this case, a communication channel represented by the arrow W11 is the optimal communication channel, as is the case with FIG. 1. It is assumed that such a state is made into a state in which the communication channel is blocked by the blocking object 13 as denoted by an arrow Q22, for example. That is, it is assumed that blocking of the communication channel by the blocking object 13 is detected.

In the technique, an amount of movement of the HMD 12 to a position that escapes the blocking of the communication channel is then calculated according to a result of detection of the blocking as denoted by an arrow Q23 and the position posture information is updated so that the HMD 12, that is, the user, moves by the amount of movement. Here, an arrow M11 represents the amount of movement in the real space, and the position posture information is updated according to the amount of movement.

Subsequently, upon generation of the content data based on the updated position posture information and reproduction of content based on the content data, the user wearing the HMD 12 unconsciously moves by the amount of movement represented by the arrow M11. In other words, the user wearing the HMD 12 is guided without particular awareness by the reproduction of the content to an appropriate position that escapes the blocking of the communication channel.

As a result, a communication channel that linearly connects the console 11 and the HMD 12 and is represented by an arrow W21 is not blocked by the blocking object 13, so that the optimal communication channel is easily ensured without provision of special equipment or the like.

As described above, the phenomenon called redirection is used in order to make the user move unconsciously by update of the position posture information.

Figure 3:
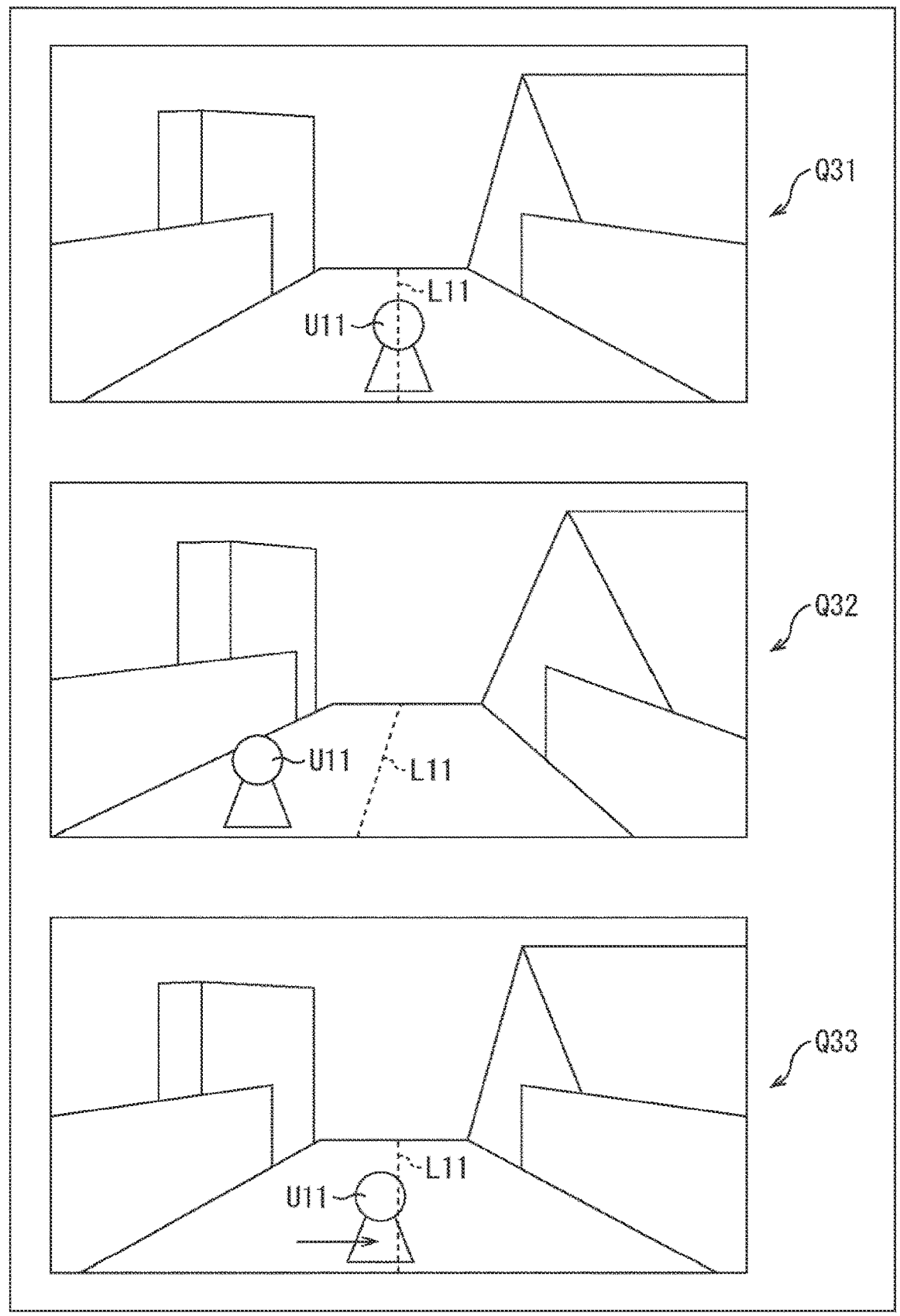
FIG. 3 is a diagram for description of ensuring an optimal communication channel.

Specifically, as indicated by an arrow Q31 in FIG. 3, for example, it is assumed that there is content providing user experience in which a user U11 walks on a road in a virtual space. At this time, the user U11 is moving his/her body so as to walk forward along a line L11 at center of the road and, at this timing, the user U11 is walking on a position of the line L11 at the center of the road.

It is assumed that the communication channel is blocked as indicated by the arrow Q22 in FIG. 2 in such a state. In this case, where it is assumed that the communication channel escapes being blocked, providing the user U11 moves by a specified amount of movement rightward as viewed from the user U11 in the real space as with an example indicated by the arrow Q23 in FIG. 2, the position indicated by the position posture information is moved (changed) by a distance corresponding to the amount of movement.

Specifically, the position posture information is updated so that a position resulting from movement from the pre-update position of the user U11 in the virtual space, leftward as viewed from the user U11, by an amount of movement in the virtual space corresponding to the amount of movement in the real space becomes a post-update position of the user U11 in the virtual space.

Upon the update of the position posture information in such a manner, content data is generated on the basis of the updated position posture information, and video indicated by an arrow Q32 is displayed as video of the content. In this example, the position of the user U11 in the virtual space deviates slightly leftward from the position at a timing indicated by the arrow Q31. That is, the user U11 is in a state of walking on a position deviating leftward in the drawing from the line L11 at the center of the road.

In this example, it is assumed that the user U11 walks along the line L11. After presentation of the video indicated by the arrow Q32, the user thus unconsciously moves his/her body so as to approach the line L11 as indicated by an arrow Q33. As a result, the user U11 is made to walk again on the position of the line L11 at the center of the road in the virtual space, while the user U11 moves to a position, in the real space, which escapes the blocking of the communication channel, that is, to a destination position indicated by the amount of movement in the real space.

In the real space, such unconscious movement of the user U11 brings about a state in which the blocking object 13 is not on the straight line connecting the HMD 12 worn on the head of the user U11 and the console 11, as with the example denoted by the arrow Q23 in FIG. 2. That is, the state in which the communication channel is not blocked by the blocking object 13 is brought about, meaning that the optimal communication channel is ensured.

<Configuration Example of VR Content Reproduction System>

Next, the VR content reproduction system to which the present technique is applied will be described more specifically.

Figure 4:
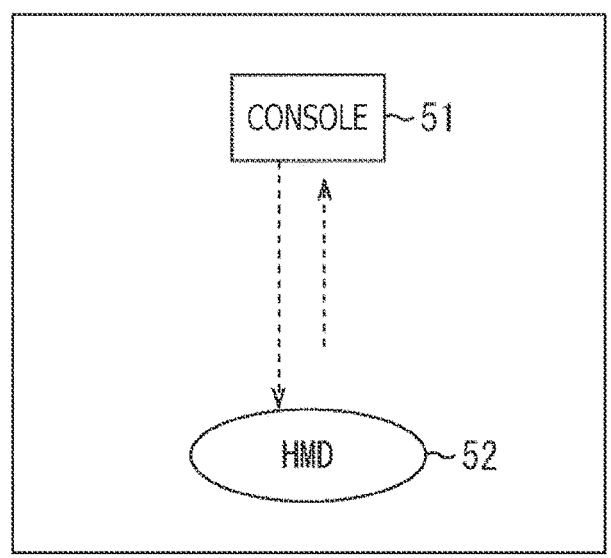
FIG. 4 is a diagram illustrating a configuration example of a VR content reproduction system.

FIG. 4 is a diagram illustrating a configuration example of an embodiment of the VR content reproduction system to which the present technique is applied.

The VR content reproduction system illustrated in FIG. 4 includes a console 51 and an HMD 52 that are in the same room.

The console 51 is an information processing device that functions as a transmitter and that transmits content data to the HMD 52 through wireless communication. Meanwhile, the HMD 52 is an information processing device (reproduction device) that functions as a receiver and that reproduces content upon reception of supply of the content data from the console 51, and the HMD 52 is worn on a head of a user who is to view and to listen to the content. The console 51 and the HMD 52 correspond to the console 11 and the HMD 12 that are illustrated in FIG. 2.

Transmission of the content data from the console 51 to the HMD 52 is carried out through wireless communication using high-frequency broadband such as 60 GHz, for example. Meanwhile, the position posture information (IMU (Inertial Measurement Unit) information), other types of control information, and the like are transmitted from the HMD 52 to the console 51 through wireless communication.

Incidentally, a wireless communication method for the information transmission from the console 51 to the HMD 52 and a wireless communication method for information transmission from the HMD 52 to the console 51 may be the same or may be different.

<Configuration Example of Console>

Figure 5:
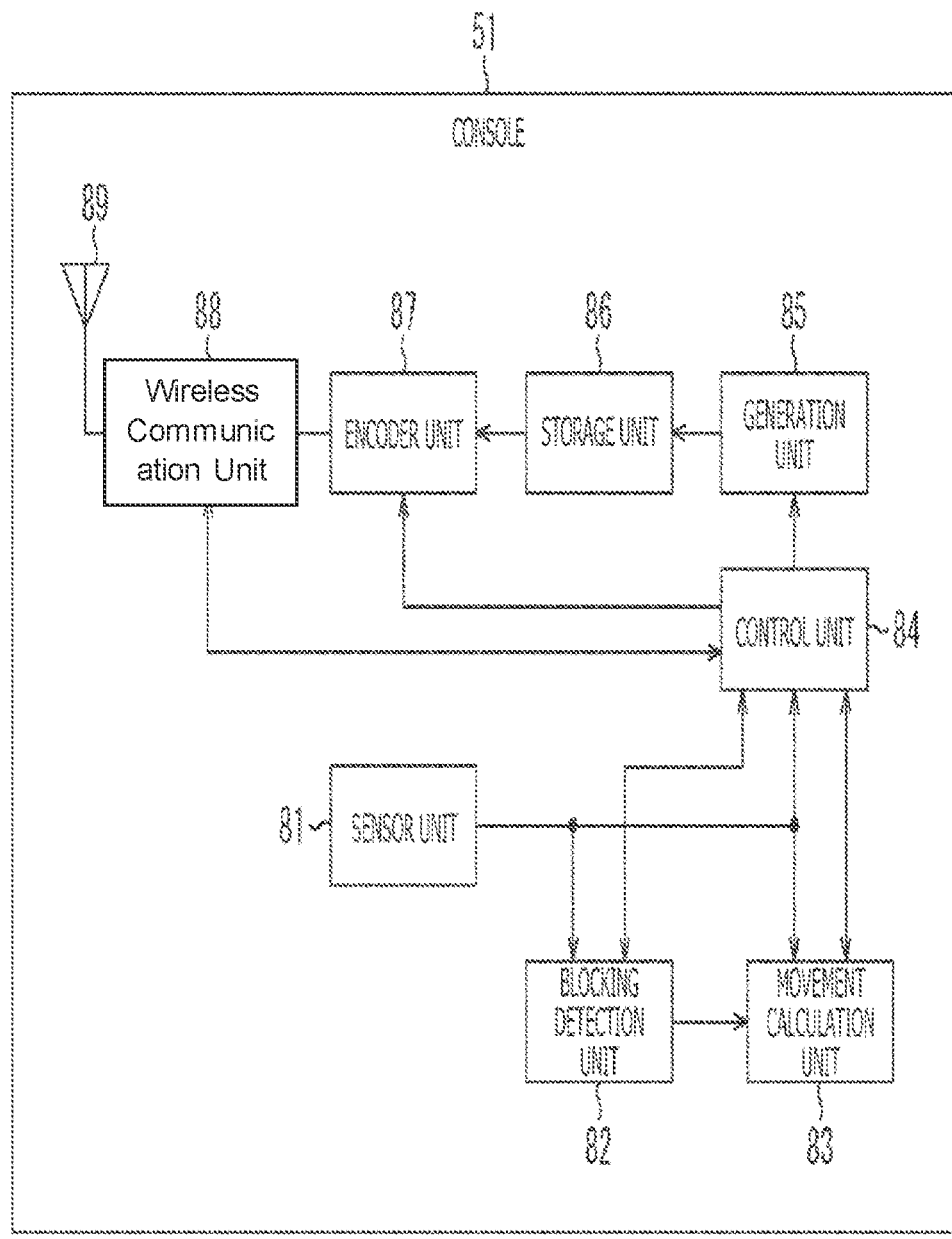
FIG. 5 is a diagram illustrating a configuration example of a console.

Further, the console 51 is configured as illustrated in FIG. 5, for example.

The console 51 illustrated in FIG. 5 includes a sensor unit 81, a blocking detection unit 82, a movement calculation unit 83, a control unit 84, a generation unit 85, a storage unit 86, an encoder unit 87, a wireless communication unit 88, and an antenna 89.

The sensor unit 81 includes such a sensor as a distance sensor such as an RGBD sensor or an ultrasonic sensor, or a camera, for example, to detect a blocking object between the console 51 and the HMD 52 and outputs sensor output information that is a result of sensing (observation result) of surroundings by the sensor.

In a case where the sensor unit 81 includes the camera, for example, an ambient environment image of the surroundings of the console 51 that is imaged by the camera is outputted as the sensor output information. In a case where the sensor unit 81 includes the distance sensor, for example, meanwhile, distance information indicating a distance, measured by the distance sensor, to an object in the surroundings of the console 51 is outputted as the sensor output information. Incidentally, description will be continued below on an assumption that the ambient environment image and the distance information are outputted as the sensor output information.

The sensor output information outputted from the sensor unit 81 is supplied to the blocking detection unit 82, the movement calculation unit 83, and the control unit 84.

The blocking detection unit 82 detects a blocking situation of the communication channel between the console 51 and the HMD 52, that is, blocking of the communication channel, on the basis of the sensor output information supplied from the sensor unit 81 and the position posture information regarding the user (HMD 52) that is supplied from the control unit 84. The blocking detection unit 82 supplies a result of detection of the blocking of the communication channel, to the movement calculation unit 83 and the control unit 84.

The movement calculation unit 83 calculates an amount of movement of the user (HMD 52) to a position that escapes the blocking of the communication channel, by using the sensor output information from the sensor unit 81, the position posture information from the control unit 84, or the like, as required, and on the basis of the result of the detection supplied from the blocking detection unit 82, and supplies the amount of movement to the control unit 84.

The amount of movement calculated by the movement calculation unit 83 is the amount of movement of the user in the real space. In addition, more particularly, the amount of movement indicates a direction and a distance of movement of the user.

The control unit 84 controls operation of the entire console 51.

For example, the control unit 84 controls generation of the content data on the basis of the amount of movement supplied from the movement calculation unit 83. Specifically, the control unit 84 updates the position posture information on the basis of the provided amount of movement and controls the generation of the content data by the generation unit 85 on the basis of the updated position posture information. Thus, the update (correction) of the position posture information is reflected in the content.

In addition, the control unit 84 controls encoding of the content data by the encoder unit 87, transmission and reception of wireless signals by the wireless communication unit 88, or the like, for example.

The generation unit 85 generates the content data, under the control by the control unit 84, and supplies the content data to the storage unit 86. In the generation unit 85, video information and audio information that constitute the content data are generated.

The storage unit 86 temporarily stores the content data supplied from the generation unit 85 and supplies the content data to the encoder unit 87. The encoder unit 87 encodes (compresses) the content data supplied from the storage unit 86, under the control of the control unit 84, and supplies resultant code information to the wireless communication unit 88.

The wireless communication unit 88 carries out wireless communication with the HMD 52 via the antenna 89, under the control of the control unit 84. That is, the wireless communication unit 88 transmits the code information supplied from the encoder unit 87, via the antenna 89 through the wireless communication, or receives the position posture information transmitted from the HMD 52, through the antenna 89, and supplies the position posture information to the control unit 84, for example.

<Description on Content Transmission Process>

Next, the operation of the console 51 will be described. That is, a content transmission process by the console 51 will be described below with reference to a flow chart of FIG. 6.

Meanwhile, it is assumed that the console 51 and the HMD 52 are in a state of carrying out the wireless communication through an optimal communication channel, that is, the communication channel linearly connecting the console 51 and the HMD 52, during the content transmission process. Depending on the blocking situation of the communication channel, however, the console 51 and the HMD 52 may be in a state in which the wireless communication is carried out through a communication channel that is not the communication channel linearly connecting the console 51 and the HMD 52 and that uses reflection or the like, as illustrated by the arrows W12 in FIG. 1, for example. Additionally, the content transmission process that will be described below is carried out for each frame of the content data, for example.

In step S11, the wireless communication unit 88 receives the position posture information transmitted from the HMD 52, through the antenna 89, and supplies the position posture information to the control unit 84. In addition, the control unit 84 supplies the position posture information supplied from the wireless communication unit 88, to the blocking detection unit 82, the movement calculation unit 83, and the like.

In the console 51, in general, the position and the posture of the HMD 52 (user) in the real space can be identified from the sensor output information from the sensor unit 81 or the like, even without reception of the position posture information from the HMD 52. In such a case, the control unit 84 may thus generate the position posture information from the sensor output information or the like, without execution of a process of step S11.

In step S12, the blocking detection unit 82 detects the blocking situation of the communication channel, that is, the blocking of the communication channel, on the basis of the sensor output information from the sensor unit 81 and the position posture information from the control unit 84, and supplies a result of such detection to the movement calculation unit 83 and the control unit 84.

The blocking detection unit 82 is capable of identifying (detecting) the position of the HMD 52 in the real space, a position and a size of a blocking object between the console 51 and the HMD 52, or the like on the basis of the ambient environment image, the distance information, the position posture information, or the like as the sensor output information, for example.

In a case where a blocking object is then detected between the console 51 and the HMD 52, for example, such detection means that the blocking situation in which the communication channel is blocked is detected. That is, the detection means that the blocking of the communication channel is detected.

In step S13, the control unit 84 determines whether the blocking of the communication channel is detected or not, on the basis of the result of the detection of the blocking situation supplied from the blocking detection unit 82.

In a case where time-series sensor output information is obtained by the sensor unit 81, incidentally, an object that may be a blocking object and a direction and a velocity of movement of the object can be detected on the ambient environment image. Thus, it is made possible for the blocking detection unit 82 to predict timing (clock time) at which the communication channel will be blocked in the future and a time period for which the communication channel is to be blocked, that is, duration of the blocking.

In the control unit 84, it may thus be determined in step S13 that the blocking is detected, not only in the case where the communication channel is actually blocked but also in the case where it is predicted that the communication channel will be blocked after a specified time period. When it is predicted that the communication channel will be blocked as a result of movement of the blocking object, incidentally, such an amount of movement of the user (HMD 52) in a direction opposed to the direction of the movement of the blocking object as to ensure the optimal communication channel may be calculated in step S15 to be described later.

In a case where it is determined in step S13 that the blocking is not detected, the control unit 84 supplies the position posture information received in step S11, to the generation unit 85, to command generation of the content data, and the process thereafter advances to step S14.

In step S14, the generation unit 85 generates the content data according to the position posture information supplied from the control unit 84, that is, the position posture information received in step S11, and supplies the content data to the storage unit 86. The storage unit 86 temporarily stores the content data supplied from the generation unit 85.

Specifically, the generation unit 85 retains video data group including plural items of video data imaged from different viewpoints and audio data for reproduction of sounds of plural sound sources (objects), as data for the generation of the content data, for example.

The generation unit 85 carries out a rendering process on the basis of the video data group and the position posture information and thereby generates video information with a viewpoint position and a line of sight that correspond to the position posture information, as video information constituting the content data, for example.

In addition, the generation unit 85 carries out VBAP (Vector Base Amplitude Panning) and a binaural process, a panning process, or the like as the rendering process on the basis of the audio data and the position posture information and thereby generates audio information constituting the content data, for example.

Reproduction of audio based on the audio information obtained in such a manner enables reproduction of a sound field as if the user in a position indicated by the position posture information listens to sounds from sound sources in predetermined positions or the like in the virtual space, that is, reproduction of sound localization.

After the content data is generated through the processes of step S14, the process advances to step S18.

In a case where it is determined in step S13 that the blocking is detected, by contrast, the control unit 84 issues a command for the movement calculation unit 83 to calculate the amount of movement, and the process thereafter advances to step S15.

In step S15, the movement calculation unit 83 calculates (computes) the amount of movement of the user in the real space pursuant to the command from the control unit 84, with use of the sensor output information from the sensor unit 81, the position posture information from the control unit 84, or the like, as required, and on the basis of the result of the detection supplied from the blocking detection unit 82, and supplies the amount of movement to the control unit 84.

The blocking detection unit 82 is capable of detecting what degree of size a blocking object blocking the communication channel has, as the blocking situation of the communication channel, for example. Accordingly, the movement calculation unit 83 is capable of identifying in which direction and how far the HMD 52 is to be moved in the real space in order to escape the blocking of the communication channel, on the basis of a positional relation between the console 51, the HMD 52, and the blocking object, the result of the detection of the blocking, or the like. That is, the amount of movement, i.e., a direction and a distance of movement, of the HMD 52 (user) to a position that escapes the blocking of the communication channel in the real space can be calculated.

In step S16, the control unit 84 updates the position posture information indicating the position and the posture of the user in the virtual space, on the basis of the amount of movement supplied from the movement calculation unit 83. Then, the control unit 84 supplies the updated position posture information to the generation unit 85 and thereby commands (controls) generation of content data.

In step S17, the generation unit 85 generates the content data according to the updated position posture information supplied from the control unit 84 and supplies the content data to the storage unit 86. Meanwhile, the storage unit 86 temporarily stores the content data supplied from the generation unit 85.

In step S17, incidentally, the content data is generated through a process that is similar to the process of step S14. That is, the process of step S17 and the process of step S14 are different only in whether the position posture information has been updated or not and are the same in other respects.

Upon the generation of the content data through the process of step S14 or step S17, the encoder unit 87 encodes the content data stored in the storage unit 86, under the control of the control unit 8, in step S18. The encoder unit 87 supplies code information obtained through encoding, to the wireless communication unit 88.

In step S19, the wireless communication unit 88 transmits the code information supplied from the encoder unit 87, through wireless communication via the antenna 89, under the control of the control unit 84, and then the content transmission process is ended. In this case, the content is reproduced in the HMD 52 on the basis of the content data, so that guidance to the position that escapes the blocking is provided as described with reference to FIG. 3, for example.

In the HMD 52, additionally, the content data (code information) transmitted in step S19 is received, and the content is reproduced on the basis of the received content data. In step S19, incidentally, the code information may be transmitted through the communication channel linearly connecting the console 51 and the HMD 52 or through a communication channel that is not the communication channel linearly connecting the console 51 and the HMD 52 and that uses reflection or the like, as illustrated by the arrows W12 in FIG. 1, for example, depending on the blocking situation of the communication channel.

Figure 7:
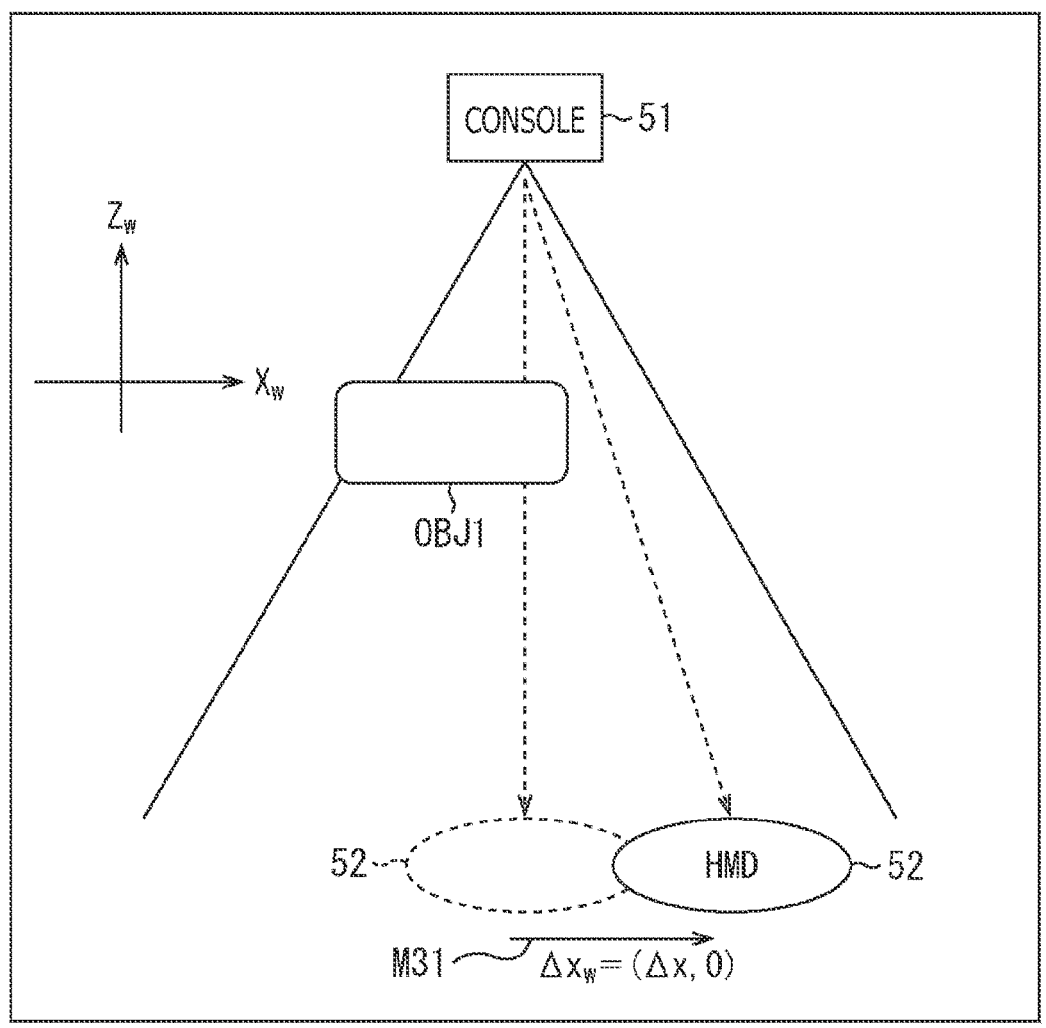
FIG. 7 is a diagram for description of calculation of an amount of movement of an HMD.
Figure 8:
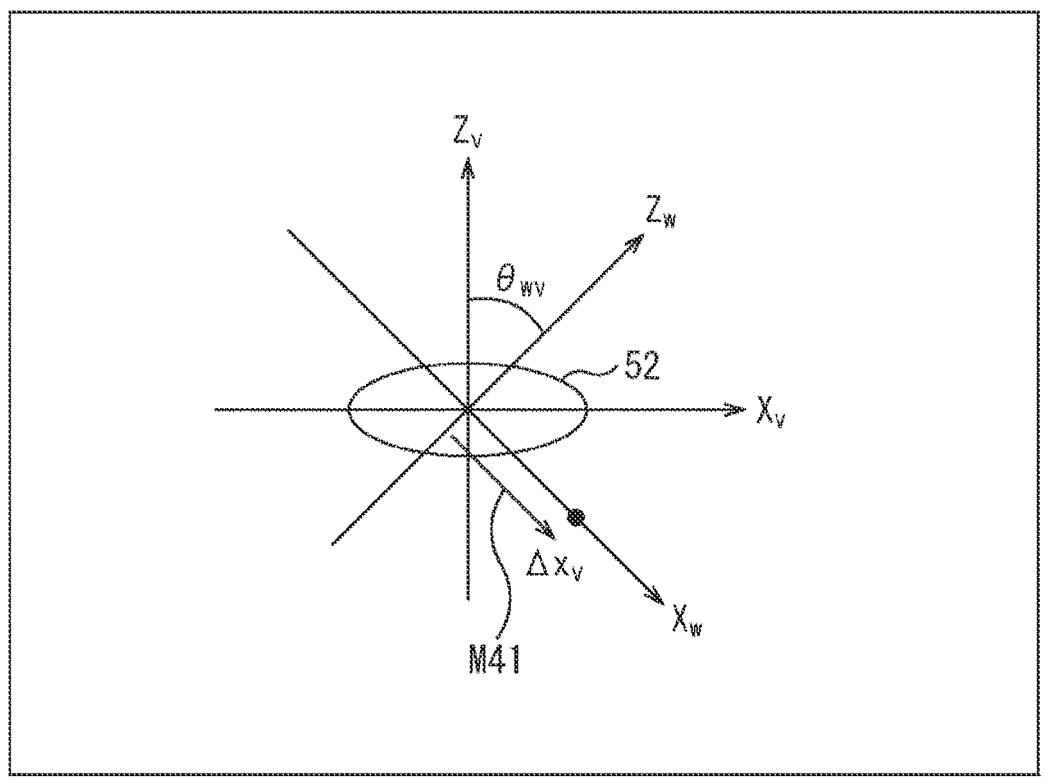
FIG. 8 is a diagram for description of calculation of an amount of movement of the HMD.

With reference to FIGS. 7 and 8, here, the processes to be carried out in step S15 and step S16 will be described more specifically.

It is assumed, for example, that the position and the posture of the HMD 52, the position and the size of the blocking object, and the like in the real space have been recognized in the blocking detection unit 82 on the basis of the sensor output information, the position posture information, or the like and that a positional relation between the console 51, the HMD 52, and a blocking object OBJ1 in the real space has consequently been identified as illustrated in FIG. 7, for example.

In such a case, the movement calculation unit 83 is capable of calculating a vector $\Delta x_w$ indicating an amount of movement of the HMD 52 to a destination that escapes intersection of a straight line connecting the console 51 and the HMD 52 and of the blocking object OBJ1 in the real space, on the basis of the positional relation identified by the blocking detection unit 82. That is, the vector $\Delta x_w$ indicating the destination of the HMD 52 that makes the communication channel linearly connecting the console 51 and the HMD 52 escape being blocked by the blocking object OBJ1 can be calculated.

In the example illustrated in FIG. 7, the real space coordinate system is supposed to be a three-dimensional orthogonal coordinate system having an origin at a position of the HMD 52 at the onset of reproduction of the content and having axes of $X_w$ axis, $Y_w$ axis, and $Z_w$ axis that are orthogonal to one another.

In particular, here, a direction of $Z_w$ axis is a direction that connects the origin which is the position of the HMD 52 at the onset of the reproduction of the content and the console 51 and that is upward in the drawing. Additionally, a direction of $X_w$ axis is a direction that is rightward in FIG. 7, and further, a direction of $Y_w$ axis is a direction that is frontward in FIG. 7, i.e., upward as viewed from the user wearing the HMD 52.

Incidentally, the origin, the directions of the axes, and the like of the real space coordinate system may be set in any manner. Further, a position of the head of the user with respect to the direction of $Y_w$ axis is basically determined by a height, a sitting height, and the like of the user wearing the HMD 52, and thus the user is incapable of following any displacement of the position of the user in the direction of $Y_w$ axis in the virtual space. Thus, though the HMD 52 is moved on $X_w Z_w$ plane here, the HMD 52 may be moved in the direction of $Y_w$ axis as well in a case where the present technique is applied to a VR content reproduction system that allows free, three-dimensional movement in a weightless space, underwater, or the like, for example.

In the example illustrated in FIG. 7, an arrow M31 represents the vector $\Delta x_w$ indicating the amount of movement of the HMD 52. Specifically, a position of a starting point of the arrow M31 represents an actual current position of the HMD 52, and a position of an end point of the arrow M31 represents a position of a target destination of the HMD 52, that is, a position of the HMD 52 that escapes the blocking of the communication channel.

Here, $\Delta x_w = (\Delta x, 0)$ holds for the vector $\Delta x_w$ because the actual current position of the HMD 52 is at the origin of the real space coordinate system, the amount of movement in the direction of $X_w$ axis being $\Delta x$, the amount of movement in the direction of $Z_w$ axis being 0.

The movement calculation unit 83 calculates the vector $\Delta x_w$ represented by the arrow M31, as the amount of movement, in step S15, and supplies the vector to the control unit 84.

Then, the control unit 84 converts the vector $\Delta x_w$ in the real space coordinate system into a vector $\Delta x_v$ in the virtual space coordinate system. The vector $\Delta x_v$ is a vector indicating an amount of movement in the virtual space that is equivalent to the amount of movement indicated by the vector $\Delta x_w$ in the real space coordinate system.

It is assumed, for example, that the virtual space coordinate system is a three-dimensional orthogonal coordinate system having axes of $X_v$ axis, $Y_v$ axis, and $Z_v$ axis which are orthogonal to one another and that the axes of $X_v$ axis, $Y_v$ axis, and $Z_v$ axis respectively correspond to the axes of $X_w$ axis, $Y_w$ axis, and $Z_w$ axis in the real space coordinate system.

In such a case, it is assumed that the virtual space coordinate system is rotated by a rotation angle $\theta_{wv}$ with respect to the real space coordinate system, as illustrated in FIG. 8, for example. That is, it is assumed that an angle made by $Z_v$ axis and $Z_w$ axis is of $\theta_{wv}$ degrees.

Such a rotation angle $\theta_{wv}$ is known, and thus the control unit 84 is capable of obtain the vector $\Delta x_v$ indicating the amount of movement of the HMD 52 in the virtual space, by making a calculation of the following expression (1) with use of a rotation matrix $R(\theta_{wv})$ for rotation of a vector by the rotation angle $\theta_{wv}$.

[Math. 1]

$$\Delta x_v = R(\theta_{wv}) \Delta x_w \quad (1)$$

In the calculation of expression (1), the vector $\Delta x_w$ is made into the vector $\Delta x_v$ by being rotated by $\theta_{wv}$ degrees pursuant to the rotation matrix $R(\theta_{wv})$. In FIG. 8, an arrow M41 represents the vector $\Delta x_v$.

Further, the control unit 84 moves the position indicated by the position posture information in the virtual space, by $-\Delta x_v$ on $X_v Z_v$ plane in order to make the HMD 52 (user) move to the position indicated by the vector $\Delta x_w$ in the real space. That is, for the current position posture information, the control unit 84 makes a correction (change) in which the position indicated by the position posture information is moved by $-\Delta x_v$ on $X_v Z_v$ plane, and uses resultant position posture information as the updated position posture information.

Then, the control unit 84 supplies the updated position posture information to the generation unit 85 so as to cause generation of the content data. The conversion process from the vector $\Delta x_w$ to the vector $\Delta x_v$ and the update process for the position posture information based on the vector $\Delta x_v$ that have been described above are carried out as the processes of step S16 described above.

Here, incidentally, the example in which the position (viewpoint position) of the user in the virtual space indicated by the position posture information is moved by $-\Delta x_v$ has been described.

Instead of the movement of the position indicated by the position posture information, however, movement of the virtual space itself from a current position may be carried out by the amount of movement indicated by the vector $\Delta x_v$, that is, by $\Delta x_v$. This is because the movement of the virtual space itself by $\Delta x_v$ is equivalent to the movement of the position of the user in the virtual space by $-\Delta x_v$.

In a case where the virtual space is moved, the control unit 84 commands the generation unit 85 to generate content data having the virtual space moved by $\Delta x_v$, and the generation unit 85 carries out the rendering process according to such a command from the control unit 84, so as to generate the content data having the virtual space moved by $\Delta x_v$.

In this case, the rendering process regarding the video information, the audio information, and the like is carried out with the virtual space coordinate system displaced by $\Delta x_v$, and the position indicated by the position posture information is consequently moved by $-\Delta x_v$.

In the case where the blocking of the communication channel is detected, as described above, the console 51 calculates the amount of movement by which the user (HMD 52) is to be moved, updates the position posture information on the basis of the amount of movement, and generates the content data on the basis of the updated position posture information.

Such processes enable unconscious guiding of the user to an appropriate place with use of the redirection and ensuring of the optimal communication channel.

For step S16, incidentally, description stating that the position posture information is corrected (changed) by the amount corresponding to the vector $\Delta x_w$ indicating the amount of movement calculated in step S15 has been given. In other words, the example in which the user is moved at a time by the amount of movement indicated by the vector $\Delta x_v$ in the virtual space has been described. The user, however, may be moved over time corresponding to several frames of the content data, that is, in small split steps.

On condition that the blocking of the communication channel is detected at time t, for example, that the vector $\Delta x_v$ indicating the amount of movement in the virtual space is obtained, and that the corresponding movement is reflected in the content data at once at subsequent time t', there is a risk for the user to recognize a sudden change in the position and the user experience to be harmed. Thus, instead of the movement at a time by the amount corresponding to the obtained vector $\Delta x_v$, split movement over a predetermined number of times, movement by a predetermined amount of movement each time, or the like may be carried out, for example.

In a case where a number N of times of the movement, that is, the number N of splits, is predetermined, for example, the control unit 84 updates the position posture information by setting the amount of movement in the virtual space to be $\Delta x_v/N$ in step S16.

In this case, a process in which the control unit 84 updates the position posture information by moving the position indicated by the current position posture information, by $-\Delta x_v/N$, and controls generation of content data on the basis of the updated position posture information and the process in which the wireless communication unit 88 transmits the content data through wireless communication are carried out N times consecutively.

In this example, in which the amount of movement at a time, that is, the amount of movement for one frame, for example, is $\Delta x_v/N$, the movement of the user by the vector $\Delta x_v$ is completed after the movement of N times (after N frames). Such processes enable reliable completion of the movement of the user within a predetermined time period and ensuring of the optimal communication channel.

Meanwhile, it is assumed that the amount of movement at a time is determined so as to be $\delta_v$ (where, $\delta x_v > 0$), for example. That is, it is assumed that the amount of movement $\delta x_v$ at a time is determined so as to meet $\delta x_v = k$ [mm] (k=2, for example) or the like.

In such a case, with the number of times of the process being M, the movement by the amount $\delta x_v$ is iterated until $\delta x_v \times M \geq |\Delta x_v|$ is satisfied. That is, the split movement is carried out M times (for M frames).

In step S16, specifically, the control unit 84 updates the position posture information with the amount of movement in the virtual space set to be $\delta x_v$.

Thus, in this case, a process in which the control unit 84 updates the position posture information by moving the position indicated by the current position posture information, by $\delta x_v$, in a direction opposed to a direction denoted by the vector $\Delta x_v$ and controls the generation of the content data on the basis of the updated position posture information and the process in which the wireless communication unit 88 transmits the content data through wireless communication are carried out M times consecutively.

Such processes enable such control as minimization of influence of the movement of the user on the user experience, though time for completion of the movement varies in each case.

Second Embodiment

<Configuration Example of HMD>

Incidentally, the above description has been given on the example of the VR content reproduction system which includes the console 51 and the HMD 52, in which the blocking of the communication channel is detected on the side of the console 51 and in which the position posture information is updated according to the result of the detection. The detection of the blocking of the communication channel, the calculation of the amount of movement, or the like, however, may be carried out on the side of the HMD 52, instead of the side of the console 51.

Figure 9:
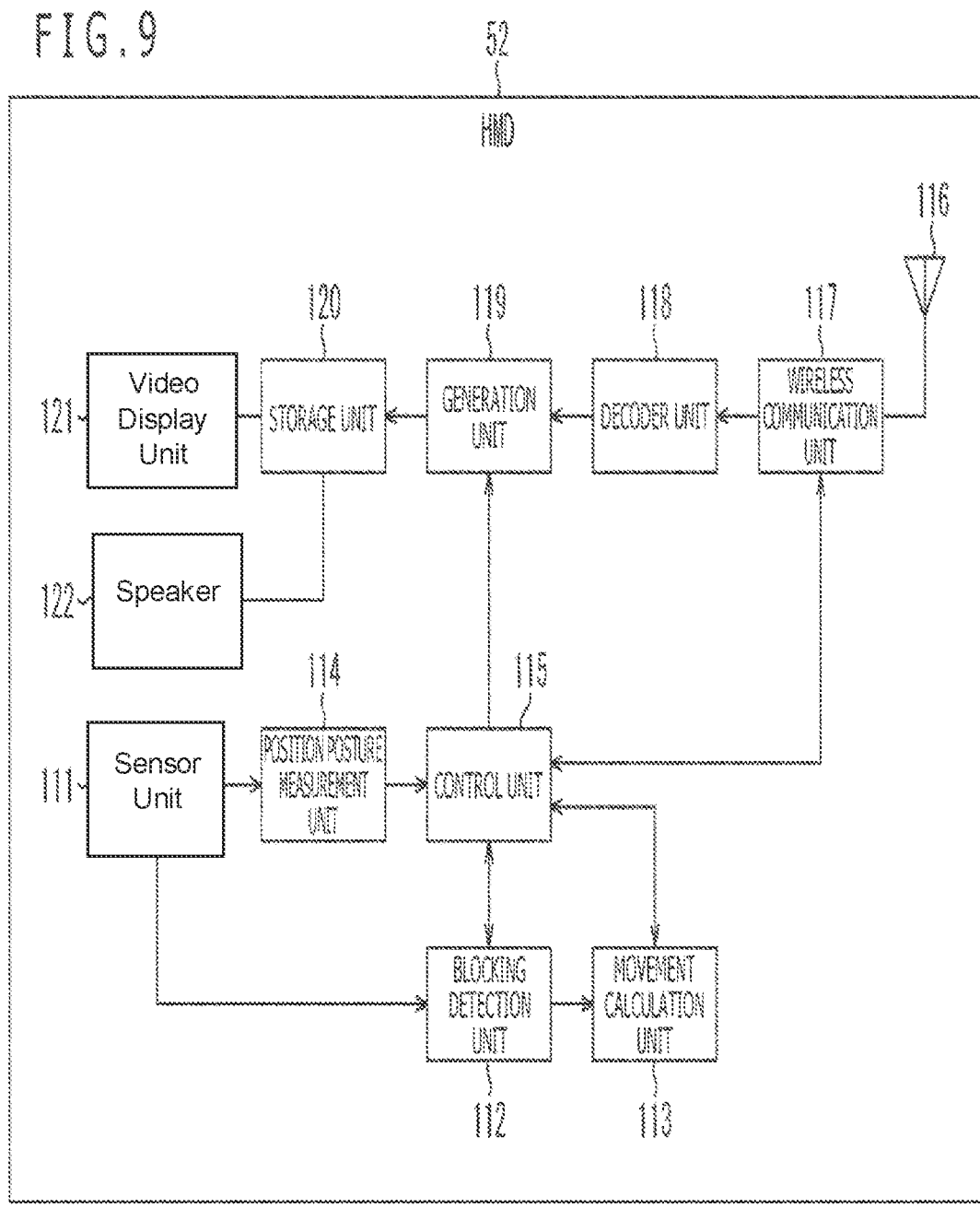
FIG. 9 is a diagram illustrating a configuration example of the HMD.

In such a case, the HMD 52 is configured as illustrated in FIG. 9, for example.

The HMD 52 illustrated in FIG. 9 includes a sensor unit 111, a blocking detection unit 112, a movement calculation unit 113, a position posture measurement unit 114, a control unit 115, an antenna 116, a wireless communication unit 117, a decoder unit 118, a generation unit 119, a storage unit 120, a video display unit 121, and a speaker 122.

The sensor unit 111 corresponds to the sensor unit 81 illustrated in FIG. 5, includes such a sensor as a distance sensor such as an RGBD sensor or an ultrasonic sensor, a camera, or a gyro sensor, for example, and supplies sensor output information obtained by the sensor to the position posture measurement unit 114 and the blocking detection unit 112.

The sensor output information outputted from the sensor unit 111 is an ambient environment image, distance information, an angular velocity indicating a change in the position, posture, or the like of the HMD 52, or the like, for example, and is used not only for the detection of the blocking situation but for measurement of the position, posture, or the like of the HMD 52.

The blocking detection unit 112 corresponds to the blocking detection unit 82 illustrated in FIG. 5 and detects the blocking situation of the communication channel on the basis of the sensor output information supplied from the sensor unit 111 and the positional relation between the console 51 and the HMD 52 that is supplied from the control unit 115, that is, a relative position of the HMD 52 with respect to the console 51. That is, the blocking of the communication channel between the console 51 and the HMD 52 is detected. The blocking detection unit 112 supplies a result of detection of the blocking of the communication channel, to the movement calculation unit 113 and the control unit 115.

Incidentally, the positional relation between the console 51 and the HMD 52 may be calculated by the control unit 115 from the position posture information supplied from the position posture measurement unit 114 or may be calculated by the control unit 115 on the basis of the sensor output information outputted from the sensor unit 111. Otherwise, the wireless communication unit 117 may receive information indicating the positional relation between the console 51 and the HMD 52 from the console 51 via the antenna 116 and may supply the information to the control unit 115.

The movement calculation unit 113 calculates (computes) the amount of movement of the user in the real space, that is, the vector $\Delta x_w$, by using the position posture information from the control unit 115, the information indicating the positional relation between the console 51 and the HMD 52, or the like, as required, and on the basis of the result of the detection supplied from the blocking detection unit 112, and supplies the amount of movement to the control unit 115.

The position posture measurement unit 114 measures the position and posture of the HMD 52 on the basis of the sensor output information supplied from the sensor unit 111, generates the position posture information from a result of such measurement, and supplies the position posture information to the control unit 115.

The control unit 115 controls operation of the entire HMD 52. For example, the control unit 115 controls transmission and reception of wireless signals by the wireless communication unit 117 or controls processing of content data by the generation unit 119 on the basis of the position posture information.

The wireless communication unit 117 carries out wireless communication with the console 51 via the antenna 116, under the control of the control unit 115. That is, the wireless communication unit 117 transmits the amount of movement (vector $\Delta x_w$) supplied from the control unit 115, or the like via the antenna 116 through wireless communication or receives code information transmitted from the console 51, through the antenna 116, and supplies the code information to the decoder unit 118, for example.

The decoder unit 118 decodes the code information supplied from the wireless communication unit 117 and supplies the resultant content data to the generation unit 119.

The generation unit 119 carries out a processing process for video information of the content data from the decoder unit 118 on the basis of the position posture information provided from the control unit 115 and under the control of the control unit 115 and supplies the content data including the processed video information and audio information to the storage unit 120. The processing process that is carried out by the generation unit 119 is a process for fine tuning (correction) of the viewpoint position or the like of the user in the virtual space according to the position posture information, for example.

The storage unit 120 temporarily stores the content data provided from the generation unit 119, supplies the video information of the stored content data to the video display unit 121, and supplies the audio information of the content data to the speaker 122.

The video display unit 121 includes a liquid crystal display panel or the like, for example, and displays video of the content on the basis of the video information supplied from the storage unit 120. The speaker 122 outputs sounds to reproduce audio of the content on the basis of the audio information supplied from the storage unit 120.

Description on Content Reproduction Process>

Next, the operation of the HMD 52 will be described.

Upon transmission of the code information from the console 51 through the wireless communication, the HMD 52 receives the code information and carries out a content reproduction process for reproduction of the content. Hereinbelow, the content reproduction process by the HMD 52 will be described with reference to a flow chart of FIG. 10.

In step S41, the wireless communication unit 117 receives the code information transmitted from the console 51 through the wireless communication, via the antenna 116, and supplies the code information to the decoder unit 118.

In step S42, the decoder unit 118 decodes the code information supplied from the wireless communication unit 117 and supplies the resultant content data to the generation unit 119.

Further, the generation unit 119 appropriately carries out the processing process for the video information of the content data from the decoder unit 118, under the control of the control unit 115, and supplies the content data including the processed video information and the audio information to the storage unit 120.

In step S43, the video display unit 121 and the speaker 122 reproduce the content, and then the content reproduction process is ended.

That is, the video display unit 121 displays the video of the content on the basis of the video information supplied from the storage unit 120. Meanwhile, the speaker 122 outputs the sounds on the basis of the audio information supplied from the storage unit 120. Thus, the video and the audio of the content are reproduced.

<Description on Movement Amount Transmission Process>

Further, the HMD 52 carries out the content reproduction process described with reference to FIG. 10, detects, in parallel, the blocking of the communication channel in parallel, and also carries out a movement amount transmission process in which the amount of movement is transmitted according to a result of such detection. Hereinbelow, the movement amount transmission process by the HMD 52 will be described with reference to a flow chart of FIG. 11.

In step S71, the blocking detection unit 112 detects the blocking situation of the communication channel linearly connecting the HMD 52 and the console 51, that is, the blocking of the communication channel, on the basis of the sensor output information supplied from the sensor unit 111 and the positional relation between the console 51 and the HMD 52 that is supplied from the control unit 115. The blocking detection unit 112 supplies a result of detection of the blocking situation to the movement calculation unit 113 and the control unit 115.

Figure 6:
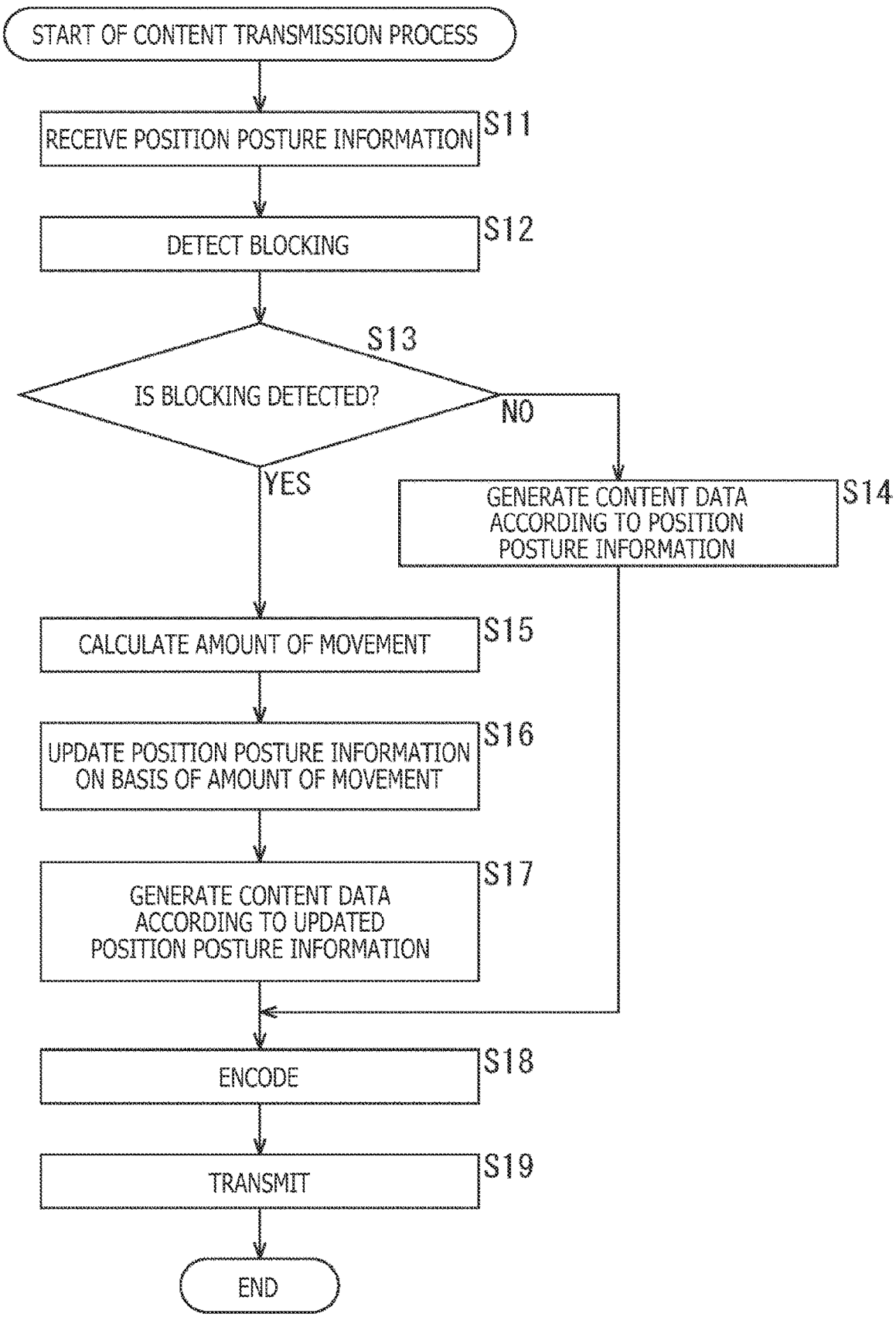
FIG. 6 is a flowchart for description of a content transmission process.

In step S71, for example, the blocking situation of the communication channel is detected through a process that is similar to a process of step S12 in FIG. 6.

In step S72, the control unit 115 determines whether the blocking of the communication channel is detected or not, on the basis of the result of the detection of the blocking supplied from the blocking detection unit 112. In step S72, for example, a determination process that is similar to that of step S13 in FIG. 6 is carried out.

In a case where it is determined in step S72 that the blocking is not detected, processes of step S73 and step S74 are not carried out, and the movement amount transmission process is ended.

In a case where it is determined in step S72 that the blocking is detected, by contrast, the control unit 115 commands the movement calculation unit 113 to calculate the amount of movement, and the process thereafter advances to step S73.

In step S73, the movement calculation unit 113 calculates (computes) the amount of movement of the user in the real space, with use of the position posture information from the control unit 115, the information indicating the positional relation between the console 51 and the HMD 52, or the like, as required, and on the basis of the result of the detection supplied from the blocking detection unit 112.

That is, the movement calculation unit 113 calculates the vector $\Delta x_w$ indicating the amount of movement through a process that is similar to that of step S15 in FIG. 6 and supplies the vector to the control unit 115, for example.

Figure 12:
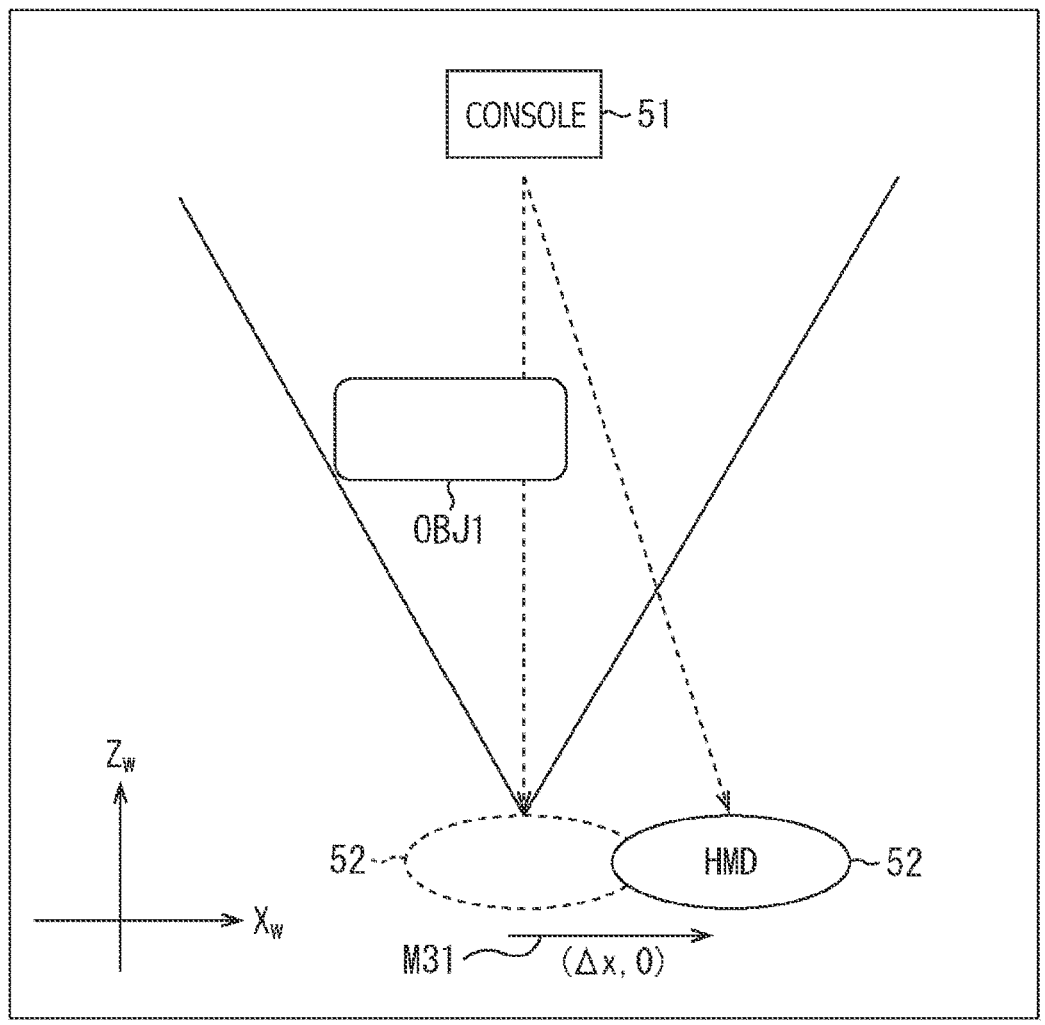
FIG. 12 is a diagram for description of calculation of an amount of movement of the HMD.

In step S73, however, the movement calculation unit 113 calculates the vector $\Delta x_w$ indicating the amount of movement in the real space on the basis of a positional relation between the blocking object OBJ1, the console 51, and the like as viewed from the HMD 52, as illustrated in FIG. 12. Incidentally, components in FIG. 12 corresponding to those in FIG. 7 are provided with the same reference signs, and description thereof is omitted appropriately.

In an example illustrated in FIG. 12, the vector $\Delta x_w$ is calculated on the basis of the positional relation between the blocking object OBJ1, the console 51, and the like as viewed from the HMD 52, contrary to the example illustrated in FIG. 7, but the same vector $\Delta x_w$ is obtained as a result. Here, the arrow M31 represents the vector $\Delta x_w$ indicating the amount of movement of the HMD 52.

Figure 11:
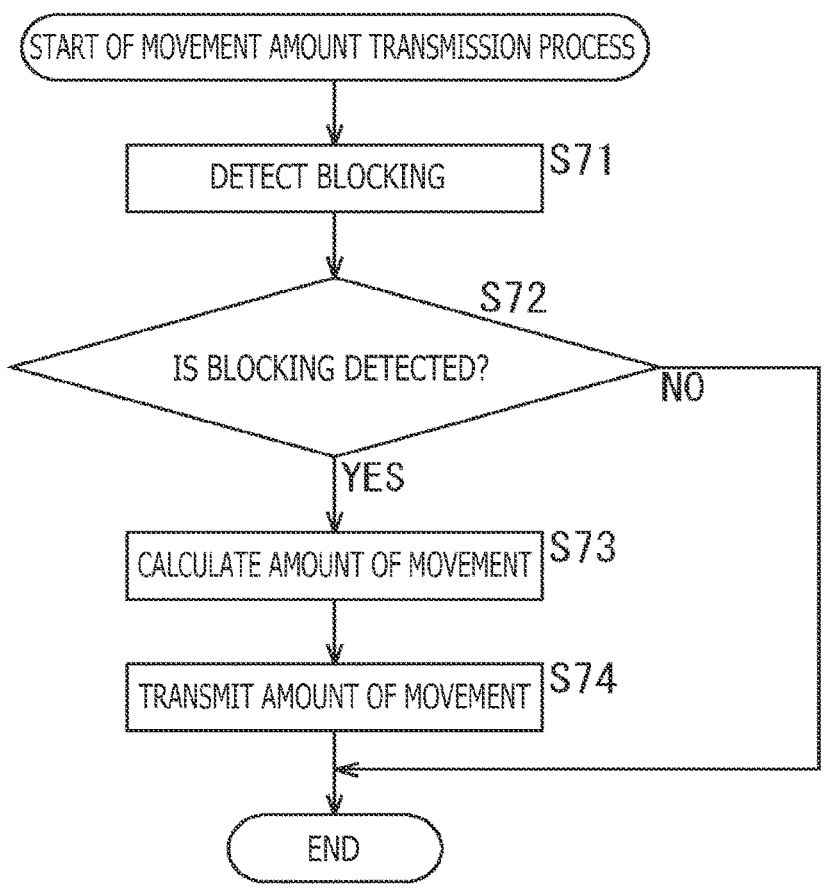
FIG. 11 is a flowchart for description of a movement amount transmission process.

To resume description of the flow chart of FIG. 11, upon supply of the vector $\Delta x_w$, that is, the amount of movement, from the movement calculation unit 113, the control unit 115 supplies the vector $\Delta x_w$ indicating the amount of movement to the wireless communication unit 117, so as to command transmission to the console 51.

In step S74, the wireless communication unit 117 transmits the amount of movement (vector $\Delta x_w$) supplied from the control unit 115, to the console 51 via the antenna 116 through wireless communication, and then the movement amount transmission process is ended.

Upon the transmission of the vector $\Delta x_w$ in such a manner, the wireless communication unit 88 of the console 51 receives the transmitted vector $\Delta x_w$ via the antenna 89 and supplies the vector $\Delta x_w$ to the control unit 84.

The control unit 84 updates the position posture information regarding the HMD 52 on the basis of the vector $\Delta x_w$ supplied from the wireless communication unit 88 and supplies the updated position posture information to the generation unit 85 so as to cause generation of content data. Here, a process that is similar to that of step S16 in FIG. 6 is carried out on an occasion of the update of the position posture information. That is, the vector $\Delta x_w$ is converted into the vector $\Delta x_v$ pursuant to the rotation matrix $R(\theta_{wv})$, and the position posture information is updated on the basis of the vector $\Delta x_v$.

Figure 10:
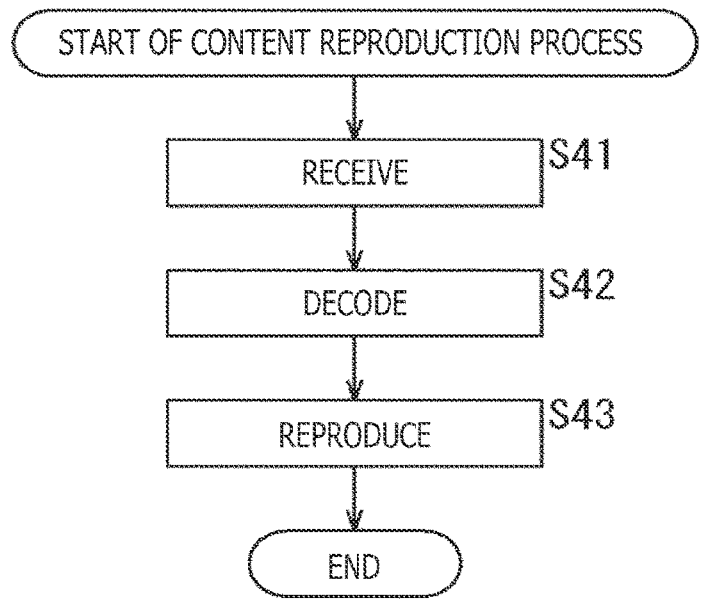
FIG. 10 is a flowchart for description of the content reproduction process.

As a result, content data that is obtained from the code information to be received in step S41 in FIG. 10 to be carried out next time is generated according to the updated position posture information, so that reproduction of the content based on the content data makes the user move unconsciously. Thus, the optimal communication channel is ensured even in the case where the blocking situation of the communication channel is detected in the HMD 52.

In the case where the blocking of the communication channel is detected, as described above, the HMD 52 calculates the amount of movement by which the user (HMD 52) is to be moved and transmits the amount of movement to the console 51. Such a process enables the unconscious guiding of the user to an appropriate place with use of the redirection and the ensuring of the optimal communication channel.

Incidentally, though the update of the position posture information that is carried out on the side of the console 51 has been described here, the position posture information may be made to be updated in the HMD 52.

In such a case, the control unit 115 acquires the position posture information generated by the position posture measurement unit 114 and updates the acquired position posture information on the basis of the vector $\Delta x_w$ provided from the movement calculation unit 113, for example. That is, the control unit 115 converts the vector $\Delta x_w$ into the vector $\Delta x_v$, and updates the position posture information on the basis of the vector $\Delta x_v$.

Then, the control unit 115 supplies the updated position posture information to the wireless communication unit 117 so as to cause transmission of the position posture information. The wireless communication unit 117 transmits the updated position posture information supplied from the control unit 115, via the antenna 116 through wireless communication. When the blocking is not detected in this case, meanwhile, the wireless communication unit 117 transmits the position posture information provided from the control unit 115 and generated by the position posture measurement unit 114, without modification via the antenna 116.

<Configuration Example of Computer>

Incidentally, a series of the processes described above may be carried out by hardware or may be carried out by software. In a case where the series of the processes is to be carried out by software, programs that constitute the software are installed into a computer. Here, the computer encompasses a computer incorporated in dedicated hardware, a general-purpose personal computer, for example, capable of performing various functions by various programs installed therein, or the like.

FIG. 13 is a block diagram illustrating a configuration example of the hardware of the computer that carries out the series of the processes described above by the programs.

In the computer, a CPU 501, a ROM (Read Only Memory) 502, and a RAM (Random Access Memory) 503 are connected to one another by a bus 504.

In addition, an input-output interface 505 is connected to the bus 504. To the input-output interface 505, an input unit 506, an output unit 507, a recording unit 508, a communication unit 509, and a drive 510 are connected.

The input unit 506 includes a keyboard, a mouse, a microphone, an imaging element, or the like. The output unit 507 includes a display, a speaker, or the like. The recording unit 508 includes a hard disk, a nonvolatile memory, or the like. The communication unit 509 includes a network interface or the like. The drive 510 drives a removable recording medium 511 such as a magnetic disk, an optical disk, a magneto-optic disk, or a semiconductor memory.

In the computer configured as described above, the CPU 501 loads programs recorded in the recording unit 508, for example, into the RAM 503 through the input-output interface 505 and the bus 504 and executes the programs, so that the series of the processes described above is carried out.

The programs to be executed by the computer (CPU 501) may be provided through being recorded in the removable recording medium 511 as a package medium or the like, for example. Alternatively, the programs may be provided through a wired or wireless transmission medium such as a local area network, the Internet, or digital satellite broadcasting.

In the computer, mounting the removable recording medium 511 in the drive 510 enables installation of the programs into the recording unit 508 through the input-output interface 505. Alternatively, the programs may be received by the communication unit 509 through a wired or wireless transmission medium and may be installed into the recording unit 508. Otherwise, the programs may be preinstalled in the ROM 502, the recording unit 508, or the like.

Incidentally, the programs to be executed by the computer may be programs in which the processes are carried out in chronological order along a sequence described herein or programs in which the processes are carried out in parallel or at a required timing such as a time when a call is made.

In addition, embodiments of the present technique are not limited to the embodiments described above and may be modified in various manners unless departing from the purport of the present technique.

For example, the present technique may have a configuration of cloud computing in which one function is processed cooperatively by being shared among plural devices through a network.

Moreover, each step described with reference to the flow charts described above may be carried out by one device or, otherwise, may be carried out by being shared among plural devices.

In a case where plural processes are included in one step, further, the plural processes included in the one step may be carried out by one device or, otherwise, may be carried out by being shared among plural devices.

In addition, the present technique may also be provided with configurations below.

(1)

An information processing device including:

a blocking detection unit configured to detect blocking of a communication channel to a reproduction device configured to reproduce content on the basis of content data;

a movement calculation unit configured to calculate, in a case where the blocking of the communication channel is detected, an amount of movement of the reproduction device to a position that escapes the blocking; and a control unit configured to control generation of the content data on the basis of the amount of movement.

(2)

The information processing device according to (1), in which the control unit updates position information indicating a position of a user in a virtual space of the content, on the basis of the amount of movement, and controls the generation of the content data on the basis of the updated position information.

(3)

The information processing device according to (2), further including:

a wireless communication unit configured to transmit the content data to the reproduction device through wireless communication.

(4)

The information processing device according to (3), in which, with an amount of movement in the virtual space corresponding to the amount of movement denoted by Δx, the control unit updates the position information by moving a position indicated by the position information, by −Δx.

(5)

The information processing device according to (3), in which, with a specified number of splits denoted by N and with an amount of movement in the virtual space corresponding to the amount of movement denoted by Δx, a process in which the control unit updates the position information by moving a position indicated by the position information, by −Δx/N, and controls the generation of the content data on the basis of the updated position information, and a process in which the wireless communication unit transmits the content data to the reproduction device are carried out N times consecutively.

(6)

The information processing device according to (3), in which, with an amount of movement in the virtual space corresponding to the amount of movement denoted by Δx, with a predetermined amount of movement defined by δx, and with the number of times of a process denoted by M, a process in which the control unit updates the position information by moving a position indicated by the position information, by δx, in a direction opposed to a direction of the amount of movement Δx and controls the generation of the content data on the basis of the updated position information, and a process in which the wireless communication unit transmits the content data to the reproduction device are carried out M times consecutively, until δx×M≥|Δx| is satisfied.

(7)

The information processing device according to any one of (2) through (6), in which the reproduction device is worn on the user who is to view and to listen to the content.

(8)

The information processing device according to (7), in which the content includes VR content.

(9)

The information processing device according to any one of (2) through (8), in which the control unit generates video information with a viewpoint corresponding to a position indicated by the updated position information, as the content data.

(10)

The information processing device according to any one of (2) through (9), in which the control unit generates audio information generated by a rendering process based on the updated position information, as the content data.

(11)

An information processing method including:

by an information processing device, detecting blocking of a communication channel to a reproduction device configured to reproduce content on the basis of content data;

calculating, in a case where the blocking of the communication channel is detected, an amount of movement of the reproduction device to a position that escapes the blocking; and controlling generation of the content data on the basis of the amount of movement.

(12)

An information processing device configured to reproduce content on the basis of content data, the information processing device including:

a blocking detection unit configured to detect blocking of a communication channel to another information processing device configured to transmit the content data;

a movement calculation unit configured to calculate, in a case where the blocking of the communication channel is detected, an amount of movement of the information processing device to a position that escapes the blocking; and a wireless communication unit configured to transmit the amount of movement to the other information processing device through wireless communication.

(13)

The information processing device according to (12), in which the wireless communication unit receives the content data generated on the basis of the amount of movement and transmitted from the other information processing device.

(14)

The information processing device according to (12), in which the content data is generated on the basis of position information that is updated according to the amount of movement and that indicates a position of a user in a virtual space of the content.

(15)

The information processing device according to (14)

in which, with an amount of movement in the virtual space corresponding to the amount of movement denoted by Δx, the position information is updated such that a position indicated by the position information is moved by −Δx.

(16)

The information processing device according to (14) or (15), in which video information with a viewpoint corresponding to a position indicated by the updated position information is included in the content data.

(17)

The information processing device according to any one of (14) through (16), in which audio information generated by a rendering process based on the updated position information is included in the content data.

(18)

The information processing device according to any one of (12) through (17), in which the information processing device is worn on a user who is to view and to listen to the content.

(19)

The information processing device according to (18), in which the content includes VR content.

(20)

An information processing method including:

by an information processing device configured to reproduce content on the basis of content data, detecting blocking of a communication channel to another information processing device configured to transmit the content data;

calculating, in a case where the blocking of the communication channel is detected, an amount of movement of the information processing device to a position that escapes the blocking; and transmitting the amount of movement to the other information processing device through wireless communication.

REFERENCE SIGNS LIST

51: Console
52: HMD
81: Sensor unit
82: Blocking detection unit
83: Movement calculation unit
84: Control unit
85: Generation unit
87: Encoder unit
88: Wireless communication unit
111: Sensor unit
112: Blocking detection unit
113: Movement calculation unit
114: Position posture measurement unit
115: Control unit
117: Wireless communication unit
121: Video display unit
122: Speaker

The invention claimed is:

1. An information processing device, comprising:
at least one processor configured to:
  detect blocking of a communication channel between the information processing device and a reproduction device, wherein the reproduction device is configured to reproduce content based on content data;
  calculate, in a case where the blocking of the communication channel is detected, an amount of movement of the reproduction device to a position that escapes the blocking of the communication channel;
  update position information, which indicates a position of a user in a virtual space of the content, based on the amount of movement of the reproduction device; and
  control generation of the content data based on the updated position information.

2. The information processing device according to claim 1, wherein the at least one processor is further configured to transmit the content data to the reproduction device through wireless communication.

3. The information processing device according to claim 2, wherein, with an amount of movement of the user in the virtual space corresponding to the amount of movement of the reproduction device which is denoted by $\Delta x$, the at least one processor is further configured to update the position information by movement of the position, indicated by the position information, by $-\Delta x$.

4. The information processing device according to claim 2, wherein, with a specified number of splits, denoted by N, of the movement of the reproduction device and with an amount of movement of the user in the virtual space corresponding to the amount of movement of the reproduction device which is denoted by $\Delta x$, the at least one processor is further configured to execute, N times consecutively,
  update, of the position information by moving the position, indicated by the position information, by $-\Delta x/N$,
  control the generation of the content data based on the updated position information, and
  transmit the content data to the reproduction device.

5. The information processing device according to claim 2, wherein, with an amount of movement of the user in the virtual space corresponding to the amount of movement of the reproduction device which is denoted by $\Delta x$, with a specific amount of movement defined by $\delta x$, and with a number of times of a split movement process, denoted by M, of the movement of the reproduction device, the at least one processor is configured to execute M times consecutively, until $\delta x \times M \geq |\Delta x|$ is satisfied:
  update the position information by moving the position, indicated by the position information, by $\delta x$, in a direction opposed to a direction of the amount of movement of the reproduction device denoted by $\Delta x$,
  control the generation of the content data based on the updated position information, and
  transmit the content data to the reproduction device.

6. The information processing device according to claim 1, wherein the reproduction device is worn on the user who is to view and to listen to the content.

7. The information processing device according to claim 6, wherein the content includes VR content.

8. The information processing device according to claim 1, wherein the at least one processor is further configured to generate video information, with a viewpoint corresponding to a position indicated by the updated position information, as the content data.

9. The information processing device according to claim 1, wherein the at least one processor is further configured to generate control unit generates audio information, as the content data, based on generated by a rendering process and based on the updated position information, as the content data.

10. An information processing method, comprising:
by an information processing device,
detecting blocking of a communication channel between the information processing device and a reproduction device, wherein the reproduction device is configured to reproduce content based of content data;
calculating, in a case where the blocking of the communication channel is detected, an amount of movement of the reproduction device to a position that escapes the blocking of the communication channel;
updating position information, which indicates a position of a user in a virtual space of the content, based on the amount of movement of the reproduction device; and
controlling generation of the content data based on the updated position information.

11. A first information processing device configured to reproduce content based on content data, the first information processing device comprising:
at least one processor configured to:
  detect blocking of a communication channel between the first information processing device and a second information processing device which is configured to transmit the content data;
  calculate, in a case where the blocking of the communication channel is detected, an amount of movement of the first information processing device to a position that escapes the blocking of the communication channel; and
  transmit the amount of movement of the first information processing device to the second information processing device through wireless communication, wherein
  the content data is generated based on position information which indicates a position of a user in a virtual space of the content, the position information is updated based on the amount of movement of the first information processing device, and the content data is further generated based on the updated position information.

12. The first information processing device according to claim 11, wherein the at least one processor is further configured to receive, from the second information processing device the content data which is generated based on the amount of movement of the first information processing device.

13. The first information processing device according to claim 11, wherein, with an amount of movement of the user in the virtual space corresponding to the amount of movement of the first information processing device which is denoted by $\Delta x$, the position information is updated such that the position indicated by the position information is moved by $-\Delta x$.

14. The first information processing device according to claim 11, wherein video information, with a viewpoint corresponding to the position indicated by the updated position information, is included in the content data.

15. The first information processing device according to claim 11, wherein audio information, generated based on a rendering process and based on the updated position information, is included in the content data.

16. The first information processing device according to claim 11, wherein the first information processing device is worn on the user who is to view and to listen to the content.

17. The first information processing device according to claim 16, wherein the content includes VR content.

18. An information processing method, comprising:

by a first information processing device configured to reproduce content based on content data, detecting blocking of a communication channel between the first information processing device and a second information processing device which is configured to transmit the content data;

calculating, in a case where the blocking of the communication channel is detected, an amount of movement of the first information processing device to a position that escapes the blocking of the communication channel; and transmitting the amount of movement of the first information processing device to the second information processing device through wireless communication, wherein the content data is generated based on position information which indicates a position of a user in a virtual space of the content, the position information is updated based on the amount of movement of the first information processing device, and the content data is further generated based on the updated information.

* * * * *